(12) United States Patent
Nayak et al.

(10) Patent No.: US 12,158,075 B2
(45) Date of Patent: Dec. 3, 2024

(54) AIR TURBINE STARTER CONTAINMENT SYSTEM

(71) Applicant: Unison Industries, LLC, Jacksonville, FL (US)

(72) Inventors: Subrata Nayak, Bangalore (IN); David Allan Dranschak, Union, OH (US); Marc David Zinger, Dayton, OH (US); Shiloh Montegomery Meyers, Miamisburg, OH (US); Jasraj Asdev, Bangalore (IN); Sharad Pundlik Patil, Bangalore (IN); Sagar Paramashivaiah, Bangalore (IN); David Raju Yamarthi, Bangalore (IN)

(73) Assignee: Unison Industries, LLC, Jacksonville, FL (US)

( * ) Notice: Subject to any disclaimer, the term of this patent is extended or adjusted under 35 U.S.C. 154(b) by 0 days.

(21) Appl. No.: 17/206,718

(22) Filed: Mar. 19, 2021

(65) Prior Publication Data
US 2021/0301728 A1     Sep. 30, 2021

(30) Foreign Application Priority Data
Mar. 26, 2020  (IN) .............................. 202011013217

(51) Int. Cl.
*F01D 21/04* (2006.01)
*F02C 7/277* (2006.01)

(52) U.S. Cl.
CPC ............ *F01D 21/045* (2013.01); *F02C 7/277* (2013.01); *F05D 2220/323* (2013.01); *F05D 2250/182* (2013.01); *F05D 2260/85* (2013.01); *F05D 2300/505* (2013.01)

(58) Field of Classification Search
CPC ...... F01D 21/045; F01D 11/12; F01D 11/122; F01D 11/125; F01D 11/127; F01D 11/08; F02C 7/277; F05D 2260/85; F05D 2300/505
USPC .............................................. 415/9
See application file for complete search history.

(56) References Cited

U.S. PATENT DOCUMENTS

| 1,698,514 | A |   | 1/1929  | Schmidt |
| 2,987,296 | A |   | 6/1961  | Ferguson, Jr. |
| 3,261,228 | A |   | 7/1966  | Rothman |
| 3,602,602 | A |   | 8/1971  | Motta |
| 4,239,452 | A | * | 12/1980 | Roberts, Jr. ............. F01D 11/12 |
|           |   |   |         | 415/173.5 |

(Continued)

FOREIGN PATENT DOCUMENTS

| CN | 108035809 A | * | 5/2018 | ............. F02C 2/277 |
| CN | 109306902 A |   | 2/2019 |   |
| GB | 2365925 A   |   | 2/2002 |   |

OTHER PUBLICATIONS

English machine translation of CN-108035809-A, Dec. 20, 2022.*

*Primary Examiner* — Christopher Verdier
(74) *Attorney, Agent, or Firm* — McGarry Bair PC (57) ABSTRACT

An air turbine starter for starting an engine, comprising a housing having an interior surface defining an interior, at least one turbine member rotatably mounted within the interior about a rotational axis, and having a plurality of circumferentially spaced blades, and a containment structure radially overlying and circumferentially surrounding the at least one turbine member extending between an outer surface and an inner surface to define a radial direction.

20 Claims, 8 Drawing Sheets

(56) References Cited

U.S. PATENT DOCUMENTS

| | | |
|---|---|---|
| 4,547,122 A | 10/1985 | Leech |
| 4,639,188 A | 1/1987 | Swadley |
| 5,632,598 A * | 5/1997 | Maier ..................... F01D 5/225 |
| | | 415/173.5 |
| 6,059,523 A | 5/2000 | Modafferi et al. |
| 6,182,531 B1 | 2/2001 | Gallagher et al. |
| 6,702,873 B2 | 3/2004 | Hartman |
| 6,814,539 B2 | 11/2004 | Farnsworth et al. |
| 7,596,938 B2 | 10/2009 | Bart et al. |
| 8,231,328 B2 | 7/2012 | Reed |
| 8,888,439 B2 | 11/2014 | Harper et al. |
| 8,932,002 B2 | 1/2015 | Makulec et al. |
| 9,062,565 B2 | 6/2015 | Mahan |
| 9,429,039 B2 | 8/2016 | Finlayson |
| 9,540,946 B2 | 1/2017 | Boeck |
| 9,598,978 B2 | 3/2017 | Hoyland et al. |
| 9,726,036 B2 | 8/2017 | Ertz et al. |
| 10,563,537 B2 | 2/2020 | Twelves, Jr. et al. |
| 2003/0017045 A1* | 1/2003 | Telakowski ............. F02C 7/277 |
| | | 415/208.2 |
| 2007/0147989 A1* | 6/2007 | Collins ................... F01D 11/02 |
| | | 415/173.1 |
| 2011/0203249 A1* | 8/2011 | Telakowski ............. F01D 25/18 |
| | | 60/39.83 |
| 2012/0141258 A1* | 6/2012 | Makulec ................ F01D 21/045 |
| | | 415/182.1 |
| 2015/0267554 A1* | 9/2015 | Boeck .................... F01D 25/164 |
| | | 384/624 |
| 2015/0292414 A1* | 10/2015 | Geck ....................... A61F 2/1648 |
| | | 137/599.11 |
| 2015/0337852 A1* | 11/2015 | Klingler ................. F01D 11/16 |
| | | 415/170.1 |
| 2015/0345320 A1* | 12/2015 | Webb .................... F01D 25/005 |
| | | 415/196 |
| 2016/0341070 A1 | 11/2016 | Garcia et al. |
| 2018/0328286 A1* | 11/2018 | Nayak ....................... F01D 5/02 |
| 2019/0032564 A1 | 1/2019 | Martinez et al. |
| 2021/0017881 A1* | 1/2021 | Diaz ....................... F01D 25/26 |

* cited by examiner

AIR TURBINE STARTER CONTAINMENT SYSTEM

CROSS REFERENCE TO RELATED APPLICATIONS

This application claims priority to India Provisional Application No. 202011013217, filed Mar. 26, 2020, which is incorporated herein by reference in its entirety.

TECHNICAL FIELD

The disclosure generally relates to a containment system for rotating components, specifically for a containment system surrounding a turbine rotor in an air turbine starter.

BACKGROUND

An aircraft engine, for example a gas turbine engine, is engaged in regular operation to an air turbine starter. The air turbine starter (ATS) can be used to initiate the rotation of the combustion engine. The ATS is often mounted near the engine and can be coupled to a high-pressure fluid source, such as compressed air, which impinges upon a turbine rotor in the ATS causing it to rotate at a relatively high rate of speed. The ATS includes an output shaft that is coupled to the turbine rotor, typically through a reducing gear box, to the engine. The output shaft thus rotates with the turbine wheel. This rotation in turn causes a rotatable element of the combustion engine (e.g. the crankshaft or the rotatable shaft) to begin rotating. The rotation by the ATS continues until the combustion engine attains a self-sustaining operating rotational speed.

BRIEF DESCRIPTION

Aspects and advantages of the invention will be set forth in part in the following description, or may be obvious from the description, or may be learned through practice of the invention.

In one aspect, the present disclosure relates to an air turbine starter for starting an engine, comprising a housing having an interior surface defining an interior, at least one turbine member rotatably mounted within the interior about a rotational axis, and having a plurality of circumferentially spaced blades, and a containment structure radially overlying and circumferentially surrounding the at least one turbine member extending between an outer surface and an inner surface to define a radial direction and having at least one circumferential groove provided in the inner surface.

Another aspect the present disclosure relates to a method of forming a containment structure for an air turbine starter, the method comprising forming the containment structure with an outer surface and an inner surface, and forming at least one circumferential groove in the inner surface.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures in which.

DETAILED DESCRIPTION

Aspects of the present disclosure are directed to a turbine engine with an air turbine starter that includes a containment structure for retaining, containing, or otherwise reducing the expulsion of ATS components. While the examples described herein are directed to application of a turbine engine and a starter, the disclosure can be applied to any implementation of a driving mechanism that generates rotational motion at a driving output and provides the rotational motion to another piece of rotating equipment. For purposes of illustration, the present disclosure will be described with respect to a starter for an aircraft turbine engine, however, the starter can have various applications including starting a gas turbine engine.

The containment structure as described herein surrounds the turbine rotor and is configured to both contain components of the turbine as well as absorb energy dissipated. Typically, metals having high toughness properties are used to form a containment shield.

A conventional air-turbine starter (ATS) includes a turbine rotor that rotates under pressurized air to transmit enough speed and torque to start a turbine engine. A metal containment shield can be mounted within the ATS to provide strength and rigidity that retains, contains, prevents, or otherwise reduces the expulsion of ATS components, including, but not limited to, turbine rotors, fragments or loose components, additional rotary components, or the like. The metal containment shield contributes significantly to weight and has limited deformation capabilities for absorbing impacts, kinetic energy, or the like. Containment systems typically include a solid metal containment band surrounding the turbine rotor that is formed of a metal having high toughness such as 17-4PH steel or INCO series metal. A higher toughness of the material results in a thinner containment band. Toughness is defined as the ability of a material to absorb energy and the plasticity to deform without fracturing. Toughness requires a balance of strength and ductility. Metals having a high toughness also have a high density which contributes to the overall weight of the containment system and the aircraft.

A drawback of high toughness metals is that these materials also have a high density, making the containment band heavy and significantly add to the weight of the overall system and thus, the aircraft. In addition, the toughness of these metal materials can only limitedly be improved by special treatments which in turn limits the energy absorption capabilities and the thickness of the containment band.

Varying the geometries of the radial cross-section and an interior surface of the containment band can enable lower weight while maintaining structural integrity. Structural changes in the containment band that introduce 'space' or 'pockets' into an otherwise solid metal ring change the way the containment band absorbs energy and deforms under the impact force resulting in less material required to form the containment band, can also decrease weight while preserving or improving the specific energy absorption capability of the containment system.

Further, incorporating lighter weight materials into all or portions of the structural elements can decrease the weight of the containment band and further aid in striking a balance between strength and ductility of the containment band. The decrease in the weight and the striking of the balance between strength and ductility of the containment band can decrease the weight of the containment band while preserving or improving the specific energy absorption capability of the containment system.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are used only for identification purposes to aid the reader's understanding of the present disclosure, and should not be construed as limiting on an embodiment, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
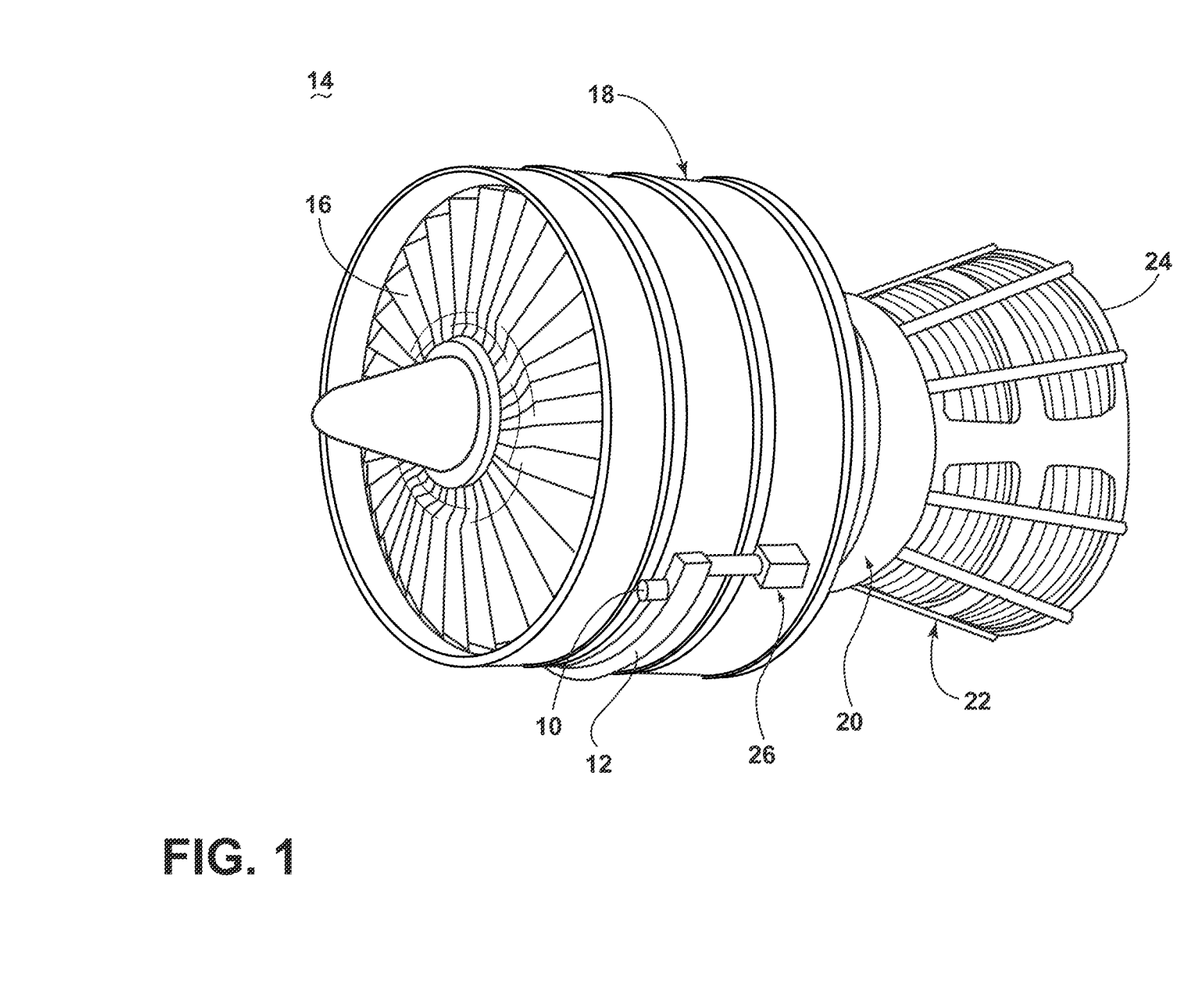
FIG. 1 is a perspective view of a turbine engine with an accessory gearbox and an air turbine starter in accordance with various aspects described herein.

Referring to FIG. 1, an air turbine starter motor or ATS 10 is coupled to an accessory gear box (AGB) 12, also known as a transmission housing, and together are schematically illustrated as being mounted to a turbine engine 14 such as a gas turbine engine. This assembly is commonly referred to as an Integrated Starter/Generator Gearbox (ISGB). The turbine engine 14 comprises an air intake with a fan 16 that supplies air to a high pressure compression region 18. The air intake with a fan 16 and the high pressure compression region collectively are known as the 'cold section' of the turbine engine 14 upstream of the combustion. The high pressure compression region 18 provides a combustion chamber 20 with high pressure air. In the combustion chamber, the high pressure air is mixed with fuel and combusted. The hot and pressurized combusted gas passes through a high pressure turbine region 22 and a low pressure turbine region 24 before exhausting from the turbine engine 14. As the pressurized gases pass through the high pressure turbine region 22 and the low pressure turbine region 24, rotational energy is extracted from the flow of the gases passing through the turbine engine 14. A shaft can connect the high pressure turbine region 22 to the high pressure compression 18 region to power the compression mechanism. The low pressure turbine can be coupled to the fan 16 of the air intake by way of a shaft to power the fan 16.

The AGB 12 is coupled to the turbine engine 14 at either the high pressure or low pressure turbine region 22, 24 by way of a mechanical power take-off 26. The mechanical power take-off 26 contains multiple gears and means for mechanical coupling of the AGB 12 to the turbine engine 14. Under normal operating conditions, the power take-off 26 translates power from the turbine engine 14 to the AGB 12 to power accessories of the aircraft for example but not limited to fuel pumps, electrical systems, and cabin environment controls. The ATS 10 can be mounted on the outside of either the air intake region containing the fan 16 or on the core near the high-pressure compression region 18.

Figure 2:
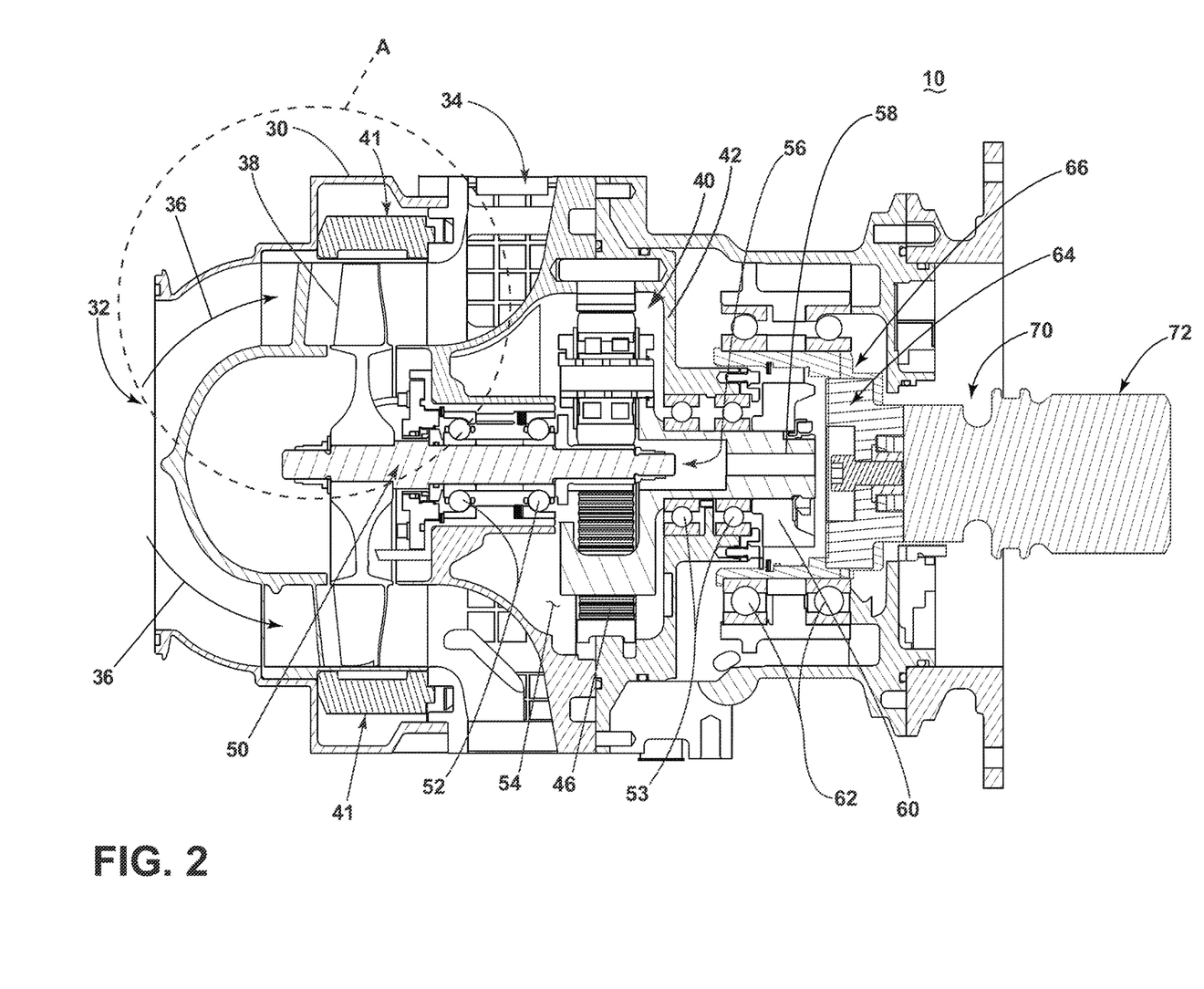
FIG. 2 is a cross-sectional view of an exemplary air turbine starter that can be included in FIG. 1.

Referring now to FIG. 2, the ATS 10, which can be mounted to the AGB 12 is shown in greater detail. Generally, the ATS 10 includes a housing 30 defining an inlet 32, an outlet 34, and a flow path 36 extending between the inlet 32 and outlet 34 for communicating a flow of gas there through. In one non-limiting example, the gas is air and is supplied from either a ground-operating air cart, an auxiliary power unit, or a cross-bleed start from an engine already operating. The ATS 10 includes a turbine member 38 within the housing 30 and disposed within the flow path 36 for rotatably extracting mechanical power from the flow of gas along the flow path 36. A containment system 41 is disposed in the housing 30 surrounding the turbine member 38. A gear box 42 is mounted within the housing 30. Further, a gear train 40, disposed within the gear box 42 and drivingly coupled with the turbine member 38, can be caused to rotate.

The gear train 40 includes a ring gear 46 and can further comprise any gear assembly including for example but not limited to a planetary gear assembly or a pinion gear assembly. A turbine shaft 50 couples the gear train 40 to the turbine member 38 allowing for the transfer of mechanical power to the gear train 40. The turbine shaft 50 is coupled to the gear train 40 and rotatably supported by a pair of turbine bearings 52. The gear train 40 is supported by a pair of carrier bearings 53. A gear box interior 54 can contain a lubricant, including, but not limited to, a grease or oil to provide lubrication and cooling to mechanical parts contained therein such as the gear train 40, ring gear 46, and bearings 52, 53.

There is an aperture 56 in the gear box 42 through which the turbine shaft 50 extends and meshes with a carrier shaft 58 to which a clutch 60 is mounted and supported by a pair of spaced bearings 62. A drive shaft 64 extends from the gear box 42 and is coupled to the clutch 60 and additionally supported by the pair of spaced bearings 62. The drive shaft 64 is driven by the gear train 40 and coupled to the AGB 12, such that during a starting operation the drive shaft 64 provides a driving motion to the AGB 12.

The clutch 60 can be any type of shaft interface portion that forms a single rotatable shaft 66 comprising the turbine shaft 50, the carrier shaft 58, and the drive shaft 64. The shaft interface portion can be by any known method of coupling including, but not limited to, gears, splines, a clutch mechanism, or combinations thereof.

The ATS 10 can be formed by any materials and methods, including, but not limited to, die-casting of high strength and lightweight metals such as aluminum, stainless steel, iron, or titanium. The housing 30 and the gear box 42 can be formed with a thickness sufficient to provide adequate mechanical rigidity without adding unnecessary weight to the ATS 10 and, therefore, the aircraft.

The rotatable shaft 66 can be constructed by any materials and methods, including, but not limited to extrusion or machining of high strength metal alloys such as those containing aluminum, iron, nickel, chromium, titanium, tungsten, vanadium, or molybdenum. The diameter of the turbine shaft 50, carrier shaft 58, and drive shaft 64 can be fixed or vary along the length of the rotatable shaft 66. The diameter can vary to accommodate different sizes, as well as rotor to stator spacing.

As described herein, air supplied along the flow path 36 rotates the turbine member 38 for driving the rotation of the rotatable shaft 66. Therefore, during starting operations, the ATS 10 can be the driving mechanism for the turbine engine 14 via rotation of the rotatable shaft 66. The non-driving mechanism, that is, the equipment being driven by the driving mechanism, can be understood as rotating equipment utilizing the rotational movement of the rotatable shaft 66, for example to generate electricity in the ATS 10.

The drive shaft 64 is further coupled to a decoupler 70. The decoupler 70 includes an output shaft 72, the output shaft 72 is operably coupled to the engine 14 such that the output shaft can rotate a portion of the engine 14.

Figure 3:
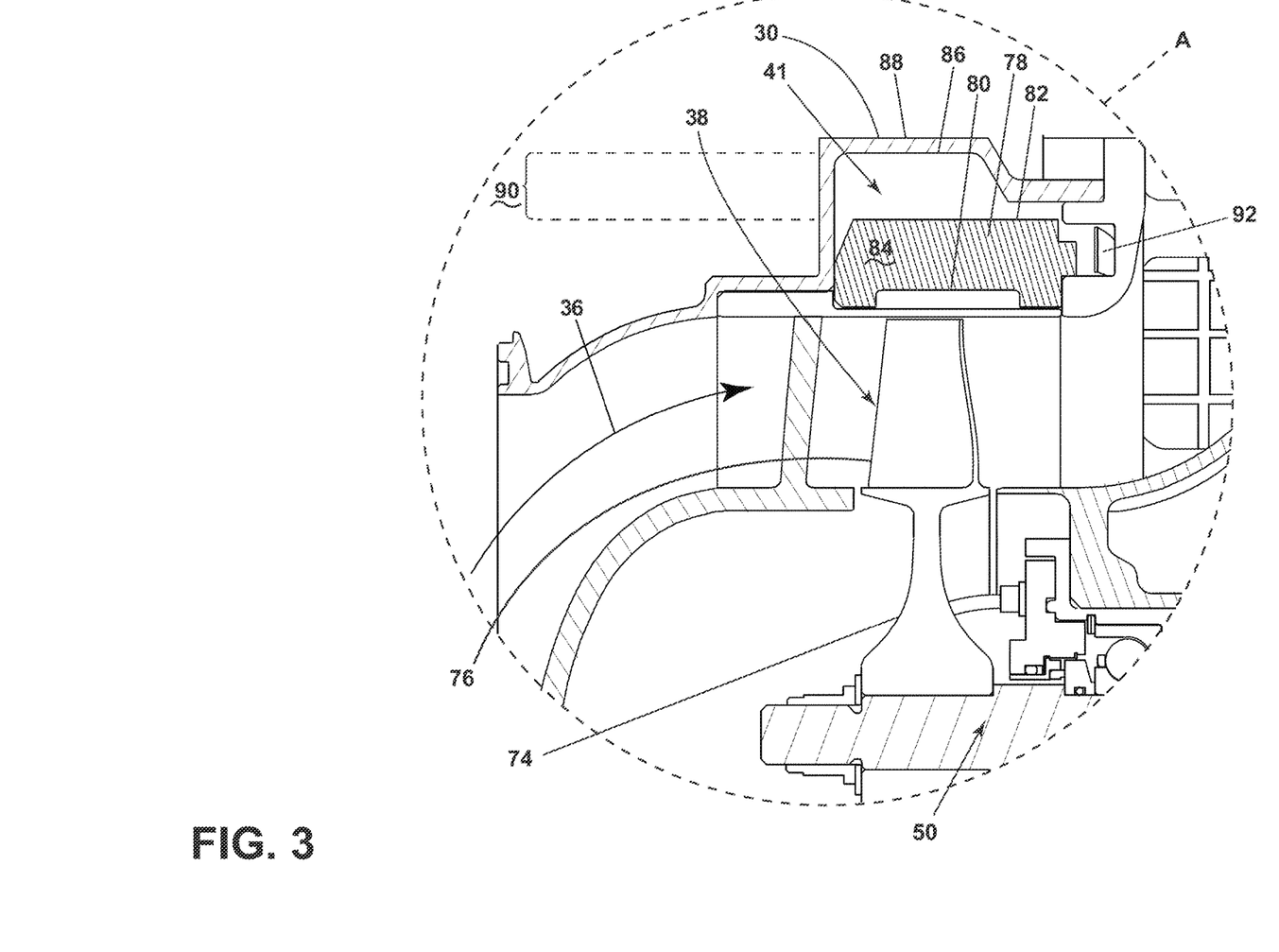
FIG. 3 is an enlarged cross-sectional view a portion of the air turbine starter of FIG. 2 including a containment system.

FIG. 3 is an enlarged view of portion A from FIG. 2 of the ATS 10 illustrating a portion of the containment system 41 and the turbine member 38. The turbine member 38 is a rotating assembly mounted about a rotational axis of the turbine shaft 50. By way of non-limiting example, the turbine member 38 comprises a turbine disc 74 having a plurality of radiating airfoils illustrated as turbine blades 76. The containment system 41 comprises a containment structure located within but separate from the housing 30 and described herein as a containment band 78 having an inner band surface 80 and an outer band surface 82 defining a thickness 84 of the containment band 78. The containment band 78 as described herein can be any containment structure utilized to surround the turbine member 38 in part or in whole and be formed from a continuous band or parts formed separately and mounted to each other. The inner band surface 80 can have a geometry complementary to the turbine member 38 such that the turbine member 38 can rotate freely in the housing 30 without contacting the containment band 78.

The housing 30 has an interior surface 86 defining an interior of the housing 30 and an outer surface 88 exterior to the housing 30. The outer band surface 82 of the containment band 78 and the interior surface 86 of the housing 30 can define a clearance distance illustrated by a radial gap 90 located between the containment band 78 and the housing 30.

The maximum amount of deformation the containment band 78 can undergo depends upon the size of the ATS 10 and the radial gap 90. The radial gap 90 allows for free deformation of the containment band 78. Free deformation of the containment band 78 can dissipate a portion of the energy, reducing the deformation of the housing 30, and reducing or eliminating potential energy transfer and damage to additional components of the housing 30.

To decrease the weight of the containment system, the containment band can be formed using thinner or lighter weight materials. As weight is removed from the containment band 78, buckle strength of the containment band 78 will decrease. Balancing an amount of removed material from the containment band 78 with maintaining the structural integrity of the containment band 78 is desirable. To preserve the structural integrity of the containment band 78 as weight is removed, stiffeners can be used. Further, modifying the cross-sectional geometry of the containment band 78 can use less material and improve the energy absorbing capabilities of the containment system 41.

During normal operation of the ATS 10 the containment band 78 is held in place in the housing 30 via one or more prestressed springs 92 inducing load on the containment band 78 against the housing 30. In the event components of the turbine disc 74 are free to move the containment band 78 can become dislodged and rotate freely to dissipate some of the energy of any loose components and deform from its original shape around the loose components to absorb some of the energy from, and contain the loose components of the turbine disc 74, to prevent damage to adjacent parts of the ATS 10.

Figure 4:
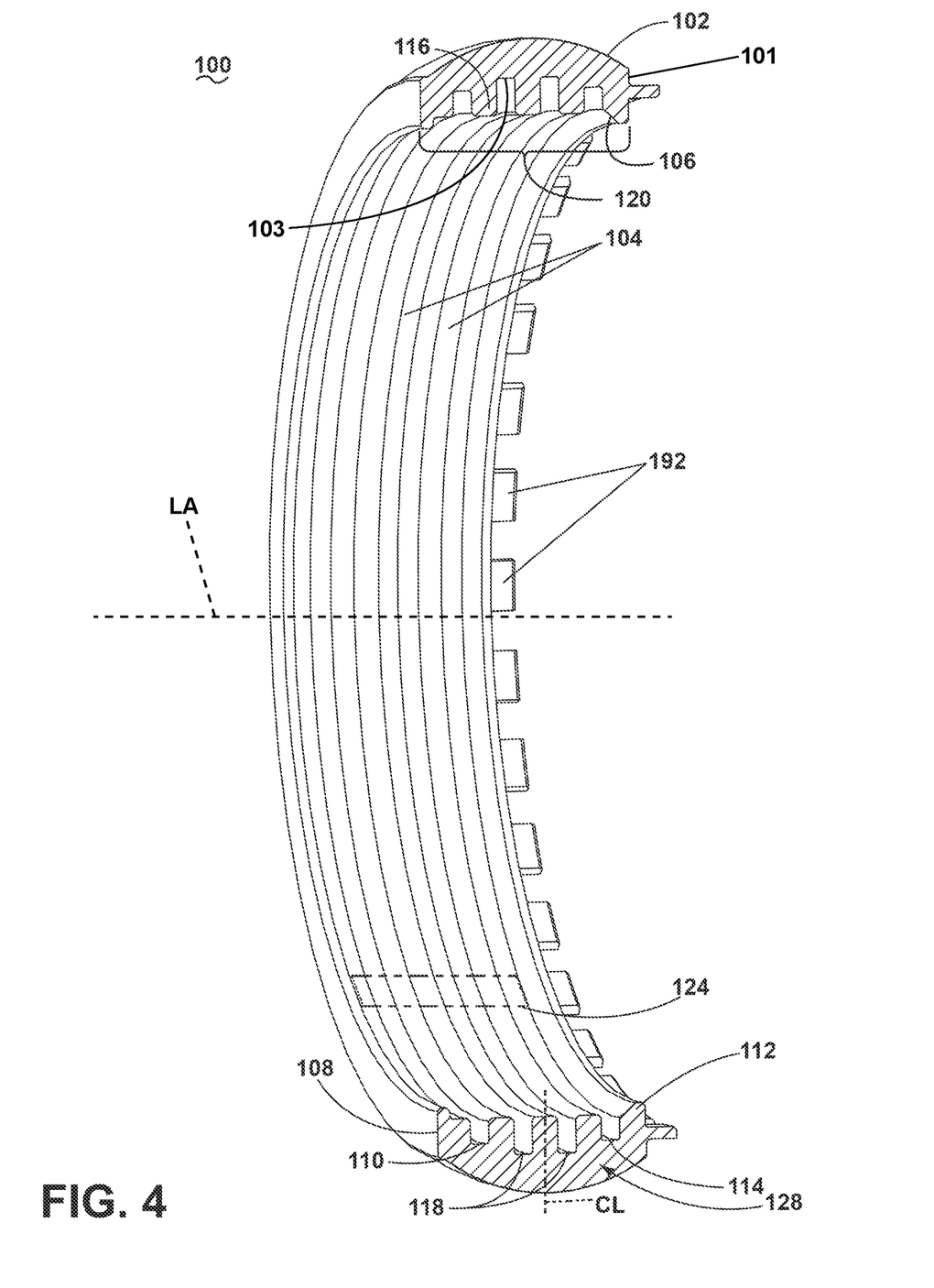
FIG. 4 is a cross-sectional view of a containment band for the containment system of FIG. 3 according to an aspect of the disclosure herein.

FIG. 4 is a radial cross-sectional view of a containment band 100 in perspective according to an aspect of the present disclosure. Containment band 100 can be the containment band 78 of FIG. 3. The containment band 100 extends circumferentially about a center longitudinal axis (LA). The containment band 100 includes a body 101 extending between an inner surface 106 and an outer surface 102. The inner surface 106 is provided radially outward from the outer surface 102, with respect to the center longitudinal axis (LA). The outer surface 102 can be an arch-shaped outer surface facing the interior surface 86 of the housing 30 and spaced from the inner surface 106. The body 101 can include one or more circumferential hoop stiffeners 104 arranged along the inner surface 106 and axially spaced from each other forming ribs 116 to define at least one groove, illustrated as multiple grooves 110, 114, 118. Each groove of the multiple grooves 110, 114, 118 extends circumferentially within the body 101, with respect to the center longitudinal axis (LA). As such, the multiple grooves 110, 114, 118 can be defined as circumferential grooves. Each groove of the multiple grooves 110, 114, 118 can be axially bounded by two ribs 116 axially adjacent one another, with respect to the center longitudinal axis (LA). It will be appreciated that a at least one groove of the multiple grooves 110, 114, 118 can be axially bounded on one axial end of the groove 110, 114, 118 by one of the ribs 116, and axially bounded at an opposing axial end of the groove 10, 114, 118 by a portion of the body 101. Each groove the multiple grooves 110, 114, 118 extends into the body 101 and terminates radially at a respective distal end 103 provided within the body 101, with respect to the center longitudinal axis (LA). It is further contemplated that a first portion 108 of the body 101 and an adjacent hoop stiffener 104 can form the first groove 110. Likewise, a second portion 112 of body 101 and an adjacent hoop stiffener 104 can form the second groove 114. The remaining middle grooves 118 can be formed from adjacent hoop stiffeners 104. Locating tabs 192 locate the containment band 100 in place in the housing 30.

The hoop stiffeners 104 can be formed of the same material or different material than the containment band 100. For example, the adjacent hoop stiffeners 104 can rest on the containment band 100, and more specifically on a profile, by way of non-limiting example a curved profile mirroring the arch-shaped outer surface 102 formed by the containment band 100 and together with the containment band 100 form the containment system 41. Further, each hoop stiffener 104 can have the same width and depth or a different width or depth as another hoop stiffener 104. Therefore, each middle groove 118 can have the same width or a different width as another middle groove 118. Similarly, each middle groove 118 can have the same depth or a different depth as another middle groove 118. The width and depth of each hoop stiffener 104 further defines the symmetry of the radial cross-section of the containment band 100. The radial cross-section of the containment band 100 can be symmetrical or asymmetrical along centerline (CL) as defined by the size and shape of each hoop stiffeners 104 and further defined by the first groove 110, the second groove 114, and each middle groove 118. By way of non-limiting example, the first, second, and middle grooves 110, 114, and 118 form a symmetrical pattern 128 along centerline (CL) when viewed in the radial cross-section.

The arch structure formed by the arch-shaped outer surface 102 of the containment band 100 can define an arch pocket 120 capable of absorbing energy of any loose components from the turbine member 38. The ribs 116 will crush and grind against the turbine blades 76, secondarily absorbing additional energy. Further, the ribs 116 and the first, second, and middle grooves 110, 114, 118 will stretch and deform to create smaller pockets in which to hold debris and 'grab' the loose components of the turbine member 38 as they grind together with the containment band 100. By 'grab' it is contemplated that the ribs 116 and the first, second, and middle grooves 110, 114, 118 essentially hold on to the loose components.

If the containment band 100 expands too much, the arch pocket 120 can flatten out causing the pocket shape to disappear. At least one transverse stiffener 124 illustrated in phantom can be placed to control post-impact radial displacement and maintain integrity of the containment band 100 while buckling and crushing locally under impact from the turbine blades 76. The at least one transverse stiffener 124 can be mounted to the inner surface 106 of the containment band 100 to hold the arch pocket 120 and the first, second, and middle grooves 110, 114, 118 formed by the ribs 116 in place preventing the containment band 100 from radial over-expansion.

Figure 5:
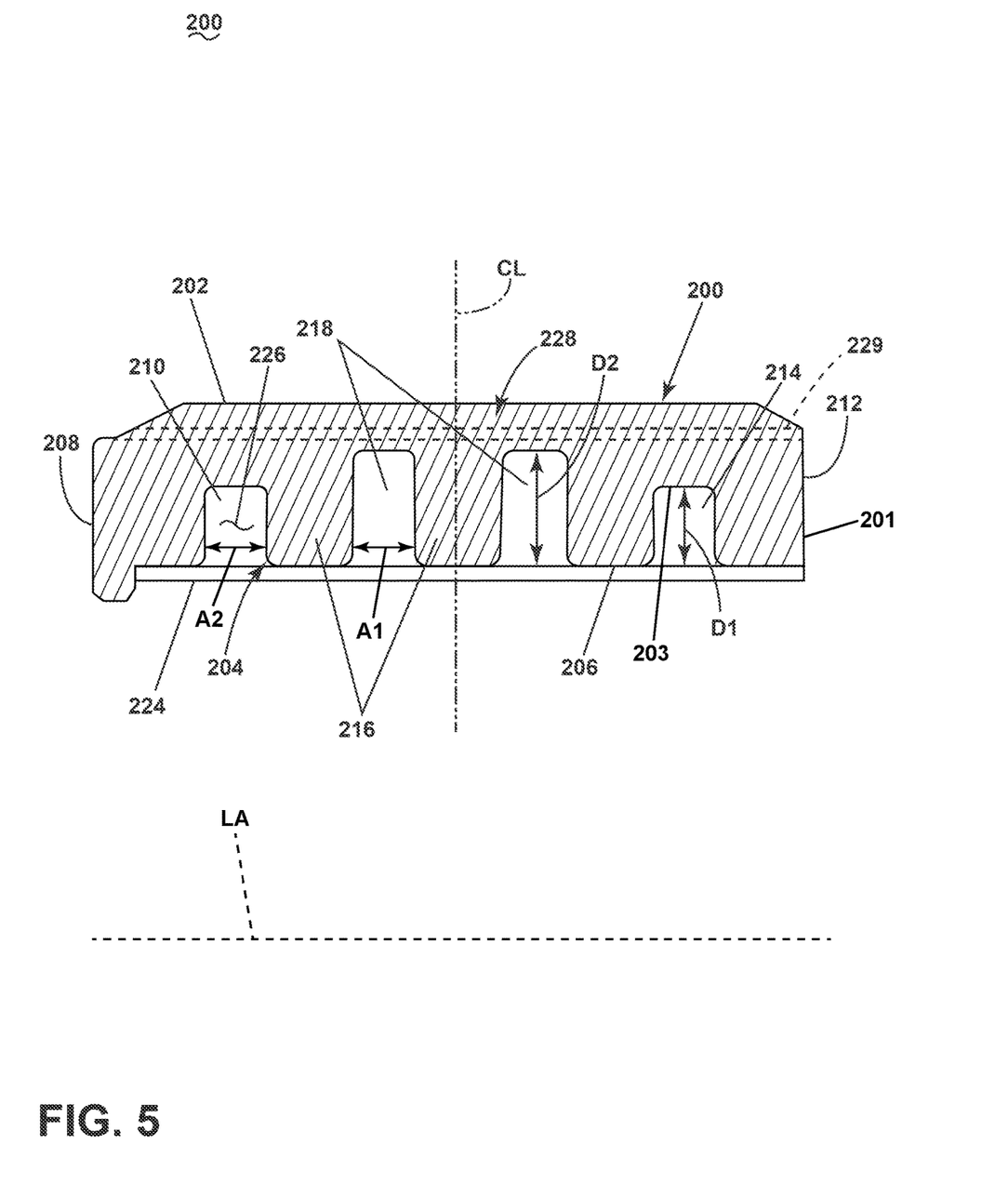
FIG. 5 is a cross-sectional view of a containment band for the containment system of FIG. 3 according to another aspect of the disclosure herein.

FIG. 5 is an enlarged cross-sectional view of a variation of the containment band 100 as previously described in FIG. 4 and illustrated as a containment band 200 according to another aspect of the present disclosure. Containment band 200 can be the containment band 78 of FIG. 3. As this variation has many similar parts as previously described, like parts are identified with like numerals increased by 100, with it being understood that the description of the like parts of the containment band 100 apply to the containment band 200 unless otherwise noted.

The containment band 200 extends circumferentially about a center longitudinal axis (LA). The containment band 200 includes a body 201 extending between an inner surface 206 and an outer surface 202. The body 201 includes a first portion 208 and a second portion 212. The containment band 200 primarily differs from the containment band 100 in that the arch-shaped outer surface 102 is replaced with the outer surface 202 being a flat-top outer surface. The body 201 includes or more circumferential and spaced apart hoop stiffeners 204 defining ribs 216 located at an inner surface 206 spaced from the flat-top outer surface 202. The containment band 200 includes at least one circumferential groove, illustrated as multiple grooves 210, 214, 218, each defining a symmetrical shape 226 when viewed in radial cross-section. By way of non-limiting example, the symmetrical shape 226 is rectangular. Each groove of the multiple grooves 210, 214, 218 extends circumferentially within the body 201. As such, the multiple grooves 210, 214, 218 can be defined as circumferential grooves. The grooves 210, 214 define depths (D1) that are shallower than the middle grooves 218 (D2). It is contemplated that the multiple grooves 210, 214, 218 form a symmetrical pattern 228 along centerline (CL) when viewed in the radial cross-section. Each groove of the multiple grooves 210, 214, 218 terminates within the body 201 at a distal end 203. Each depth (D1, D2) is defined by a maximum radial distance between the distal end 203 of the respective groove 210, 214, 218 and where the inner surface 206 meets the respective groove 210, 214, 218, with respect to the center longitudinal axis (LA). Each groove of the multiple grooves 210, 214, 218 can include a respective axial width defined as a maximum axial distance, with respect to the center longitudinal axis (LA), that the respective groove extends.

At least one transverse stiffener 224 can be placed along the inner surface 206 to control post-impact radial displacement and maintain integrity of the containment band 200 while buckling and crushing locally under impact from the turbine blades 76. The at least one transverse stiffener 224 can be mounted to the inner surface 206 of the containment band 200 to hold the multiple grooves 210, 214, 218 formed by the ribs 216 in place preventing the containment band 200 from radial over-expansion.

Optionally, one or more circumferential layers 229, shown in phantom line, can be formed of shape memory alloy (SMA) or any other material to reduce weight, reinforce, or increase energy absorbing capabilities of the containment system 41. Further, the one or more layers 229 can be provided to the flat-top outer surface 202, inner surface 206, or as an interior circumferential layer in one or more portions of the containment band 200.

Figure 6:
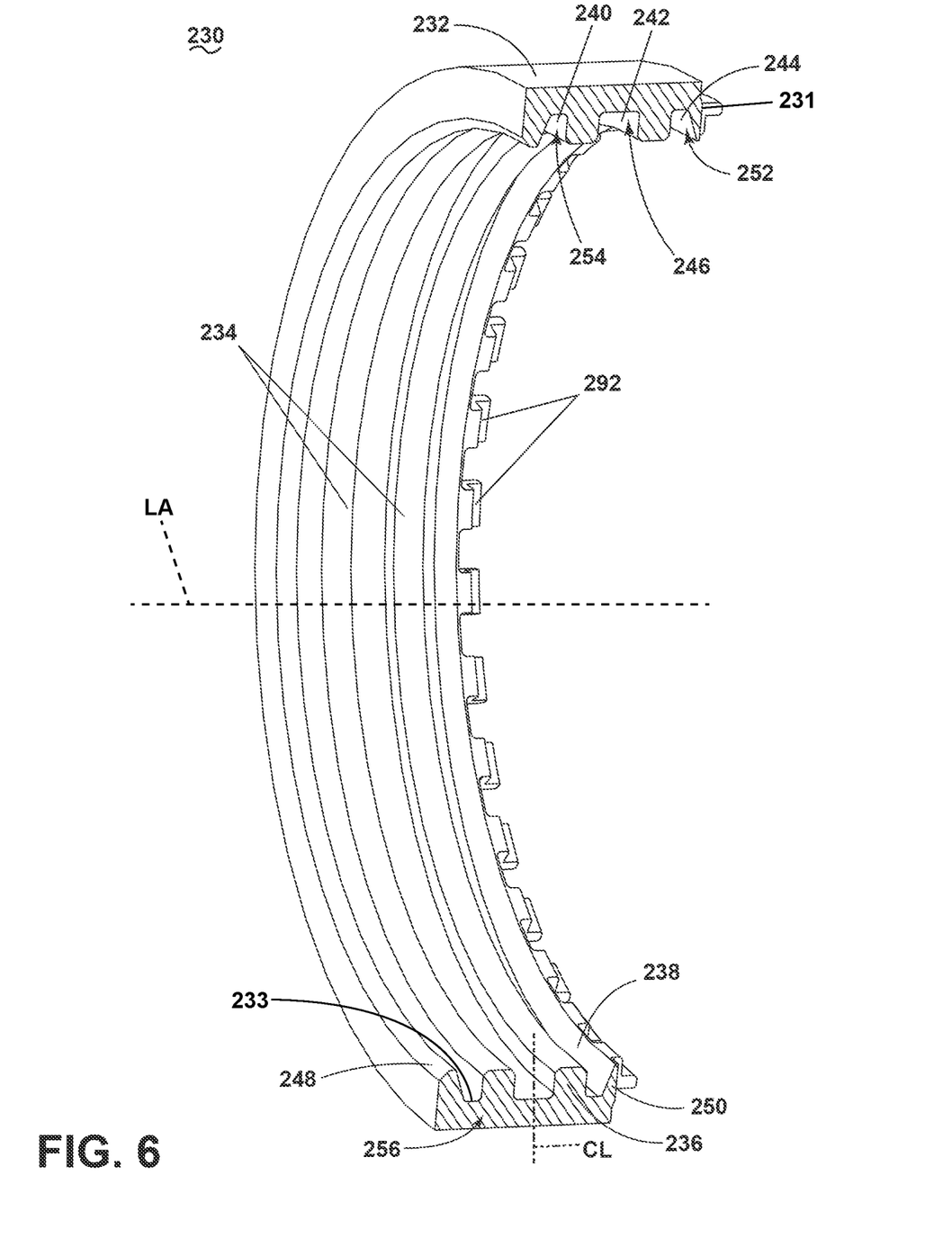
FIG. 6 is a cross-sectional view of a containment band for the containment system of FIG. 3 according to another aspect of the disclosure herein.

FIG. 6 is a cross-sectional view of half of a containment band 230 according to another aspect of the present disclosure. The containment band 230 extends circumferentially about a center longitudinal axis (LA). The containment band 230 includes a body 231 extending between an inner surface 238 and an outer surface 232. The body 201 includes a first portion 248 and a second portion 250. Again, containment band 230 can be the containment band 78 of FIG. 3. The outer surface 232 is a flat top outer surface. The body 231 includes one or more circumferential and spaced apart hoop stiffeners 234 defining ribs 236 are located at an inner surface 238 spaced from the outer surface 232. Locating tabs 292 locate the containment band 100 in place in the housing 30. The containment band 230 includes at least one circumferential groove, illustrated as multiple grooves 240, 242, 244 where the groove 242 is a middle groove 242 defined by the spaced apart hoop stiffeners 234. Each groove of the multiple grooves 240, 242, 244 extends circumferentially within the body 231. As such, the multiple grooves 240, 242, 244 can be defined as circumferential grooves. Each groove 240, 242, 244 terminates within the body 231 at a distal end 233. The middle groove 242 can define a symmetrical shape 246 when viewed in radial cross-section. By way of non-limiting example, the symmetrical shape 246 is rectangular. It is further contemplated that the first portion 248 of body 231 and an adjacent hoop stiffener 234 can form a first groove 240. Likewise, the second portion 250 of body 231 and an adjacent hoop stiffener 234 can form a second groove 244. The first and second grooves 240, 244 can define asymmetrical shapes 252, 254 that are mirror images of each other. It is contemplated that the multiple grooves 240, 242, 244 form a symmetrical pattern 256 along centerline (CL) when viewed in the radial cross-section. Further, the containment band 230 can include one or more layers of shape memory alloy extending circumferentially along at least a portion of the containment band 200.

Figure 7:
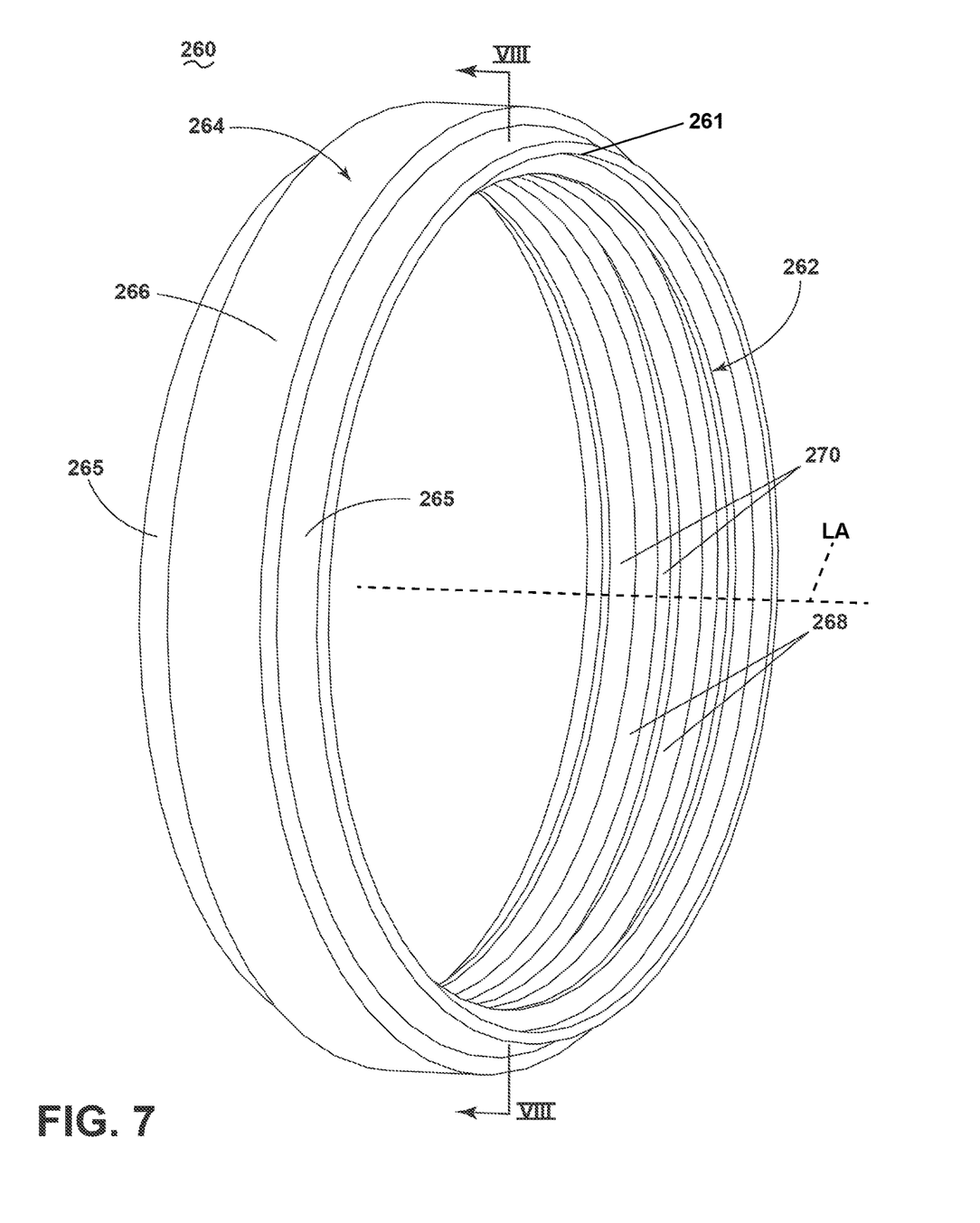
FIG. 7 is a perspective view of a containment band for the containment band of FIG. 3 according to yet another aspect of the disclosure herein.

FIG. 7, is a perspective view of a containment band 260 according to another aspect of the present disclosure. Again, containment band 260 can be the containment band 78 of FIG. 3. The containment band 260 extends circumferentially about a center longitudinal axis (LA). The containment band 260 can have a body 261 having an inner surface 262 and an outer surface 264 facing the interior surface 86 of the housing 30 and spaced from the inner surface 262. The body 261 can have a pair of flanged edges 265 separated by an outer ring 266. The body 261 can include one or more circumferential hoop stiffeners 268 can be arranged along the inner surface 262 and axially spaced from each other.

Figure 8:
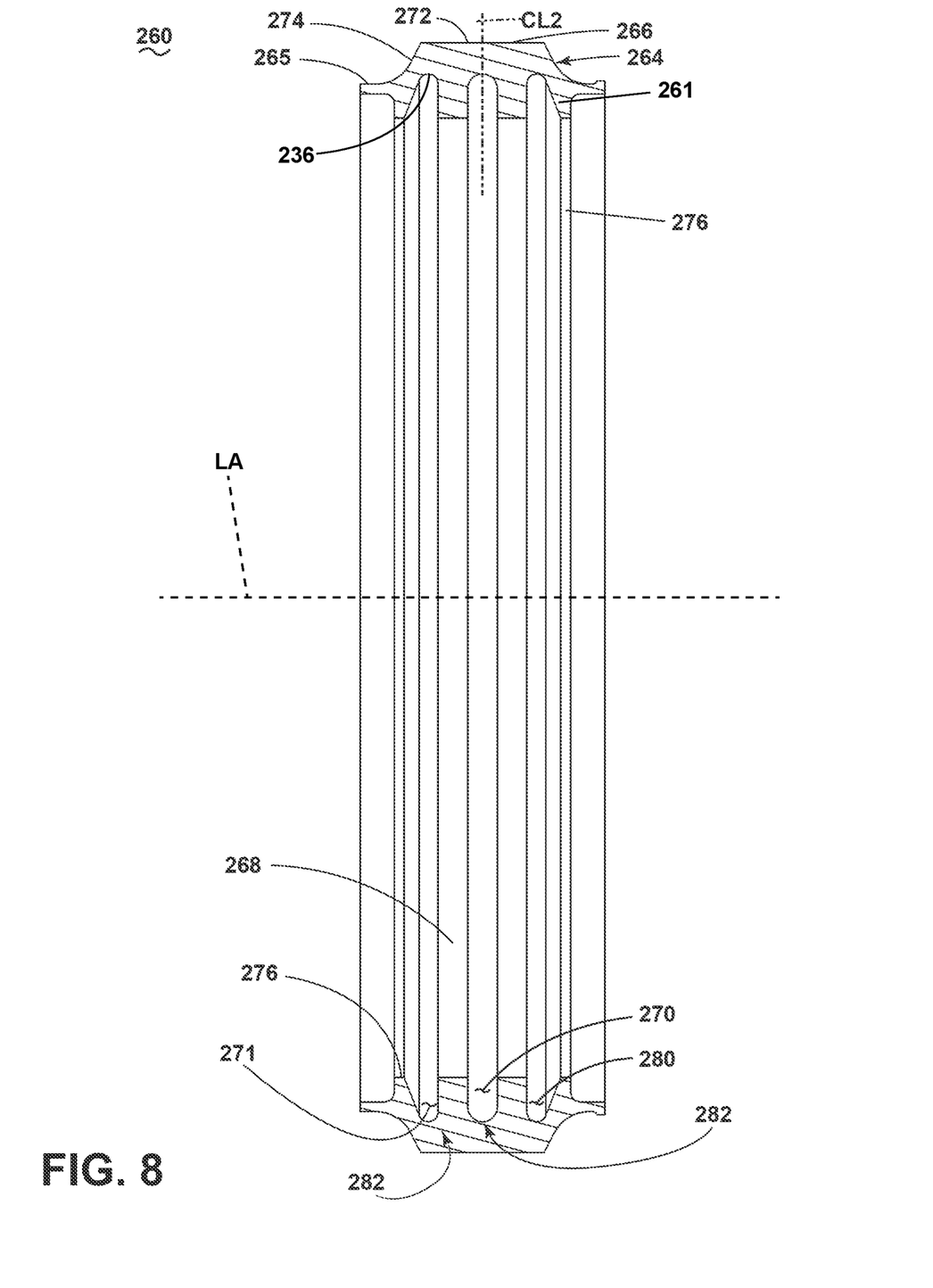
FIG. 8 is a cross-sectional view of the containment band of FIG. 7 along line VIII-VIII of FIG. 7.

FIG. 8 is a perspective cross-sectional view along line VIII-VIII of the containment band 260 of FIG. 7. The outer ring 266 can have a flat upper surface 272 with a sloped depending surface 274 joining each flanged edge 265 of the outer surface 264 to the flat upper surface 272 of the outer ring 266 defining a 'hat-shaped' structure of the outer surface 264.

The inner surface 262, spaced apart from the outer surface 264, faces the turbine member 38 and can have a pair of axially spaced radial edges 276. The one or more hoop stiffeners 268 can be arranged between each of the radial edges 276. The radial edges 276 and the hoop stiffeners 268 form ribs 280 to at least partially define at least one groove, illustrated as multiple grooves 270, 271. Each groove of the multiple grooves 270, 271 terminates radially within the body 261 at a distal end 263. It is further contemplated that the first groove 270 can be formed from adjacent hoop stiffeners 268. Likewise, the second groove 271 can be formed from the radial edge 276 and an adjacent hoop stiffener 268.

The first groove 270 can define a symmetrical shape 282 when viewed in radial cross-section. By way of non-limiting example, the symmetrical shape 282 is rectangular. It is further contemplated that the second groove 271 can define an asymmetrical shape when viewed in radial cross-section. One second groove 271 can be a mirror image of another second groove 271. It is contemplated that the multiple grooves 270, 271 form a symmetrical pattern 284 along centerline (CL2) when viewed in the radial cross-section.

The hoop stiffeners 268 can be formed of the same material or different material as the containment band 260. Further, each hoop stiffener 268 can be the same width and height or a different width or height as another hoop stiffener 268. Therefore, each first groove 270 can be the same width and depth, or a different width or depth as another groove 270. The width and depth of each hoop stiffener 268 further defines at least a portion of the symmetry of the radial cross-section of the containment band 260. The radial cross-section of the containment band 260 can be symmetrical or asymmetrical about a centerline (CL2) as defined by the size and shape of each hoop stiffener 268, each first and second groove 270, 271, and further defined by the outer surface 264.

The hat-shaped structure formed by the outer surface 264 of the containment band 260 can absorb energy transferred from any loose components from the turbine member 38 similarly to the arch pocket 120 from FIG. 4. Structurally these two exemplary containment bands 100, 260 are different and function in a similar manner. The ribs 280 will crush and grind against the turbine blades 76, absorbing the initial impact any component from the turbine member 38. The ribs 280 and the multiple grooves 270, 271 will stretch and deform locally to create pockets in which to hold debris and 'grab' the loose components of the turbine member 38, while the outer ring 266 dissipates energy through deformation.

It should be understood that while transverse stiffeners 124, 224 are illustrated in FIGS. 4 and 5, transverse stiffeners can be provided in any of the containment bands 100, 200, 230, 260 described herein.

As described herein, the containment bands 100, 200, 230, 260 are separate from the housing 30 and can float against frictional resistance generated by the spring 92. The radial gap 90 accommodates any containment band 100, 200, 230, 260 growth so as to not transfer any loads to the housing 30.

To further reduce weight of the containment bands 100, 200, 230, 260 described herein, one or more layers of shape memory alloy (SMA) can extend circumferentially along one or more portions of the containment bands 100, 200, 230, 260. Alternatively, containment band 100, 200, 230, 260 can be formed entirely from SMA. While reducing the overall weight of the containment band 100, 200, 230, 260, using SMA to reinforce one or more portions of the containment band 100, 200, 230, 260 can further increase energy absorbing capabilities of the containment system 41.

SMA materials, such as Ni—Ti alloy, exhibit pseudoelastic behavior allowing an article formed of SMA to return to its original shape after a deformation. In addition, SMAs have a high strain upon failure. Some SMA materials can have failure strains of 50-90% and twice the toughness of steel. Therefore, reinforcing a containment band by incorporating an SMA material can increase the energy absorbing capability of the containment system by allowing the containment band to deform to absorb energy while still maintaining enough structural integrity to contain any turbine rotor loose components. Further, the density of SMA is typically lower than steel. Therefore, replacing all or portions of the containment band 78 with SMA can decrease the overall weight of the containment band 78, and thus the entire aircraft.

By way of non-limiting example, the SMA described herein can comprise Nitinol which is an alloy having approximately 55% by weight nickel and 45% by weight titanium and annealed to form a part in the desired shape as is known in the art.

While illustrated as a ring structure, it should be understood that the containment bands as described herein can be a containment structure formed in parts or as a whole singular piece. It is contemplated that parts of, or the entire containment structure is additively manufactured. An additive manufacturing (AM) process is where a component is built layer-by-layer by successive deposition of material. AM is an appropriate name to describe the technologies that build 3D objects by adding layer-upon-layer of material, whether the material is plastic or metal. AM technologies can utilize a computer, 3D modeling software (Computer Aided Design or CAD), machine equipment, and layering material. Once a CAD sketch is produced, the AM equipment can read in data from the CAD file and lay down or add successive layers of liquid, powder, sheet material or other material, in a layer-upon-layer fashion to fabricate a 3D object. It should be understood that the term "additive manufacturing" encompasses many technologies including subsets like 3D Printing, Rapid Prototyping (RP), Direct Digital Manufacturing (DDM), layered manufacturing and additive fabrication. Non-limiting examples of additive manufacturing that can be utilized to form an additively-manufactured component include powder bed fusion, vat photopolymerization, binder jetting, material extrusion, directed energy deposition, material jetting, or sheet lamination.

Benefits associated with the containment system described herein include utilizing reinforcement structures to modify the cross-sectional geometries of a containment band to improve energy absorbing capabilities. Using reinforcement structures comprising lighter weight materials to reinforce the metal containment band can increase the energy absorbing capabilities of the containment band while reducing the weight of the containment band, and thus the aircraft. This increases the efficiency of the aircraft, and protects the remaining parts of the ATS. Protecting the remaining parts of the ATS during a starter failure decreases costs associated with parts and maintenance required to repair the ATS.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new examples, whether or not the new examples are expressly described. Combinations or permutations of features described herein are covered by this disclosure. Many other possible embodiments and configurations in addition to that shown in the above figures are contemplated by the present disclosure. Additionally, the design and placement of the various components such as starter, AGB, or components thereof can be rearranged such that a number of different in-line configurations could be realized.

This written description uses examples to disclose aspects of the invention, including the best mode, and also to enable any person skilled in the art to practice aspects of the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

1. An air turbine starter for starting an engine, comprising a housing having an interior surface defining an interior; at least one turbine member rotatably mounted within the interior about a rotational axis, and having a plurality of circumferentially spaced blades; and a containment structure separate from the housing, radially overlying and circumferentially surrounding the at least one turbine member, extending between an outer surface and an inner surface to define a radial direction, and having at least one circumferential groove provided in the inner surface.

2. The air turbine starter of any of the preceding clauses, wherein the at least one circumferential groove is multiple circumferential grooves.

3. The air turbine starter of any of the preceding clauses, wherein the multiple circumferential grooves define various depths.

4. The air turbine starter of any of the preceding clauses, wherein the multiple circumferential grooves form a symmetrical pattern in a radial cross-section.

5. The air turbine starter of any of the preceding clauses, wherein the multiple circumferential grooves are formed by ribs resting on the containment structure.

6. The air turbine starter of any of the preceding clauses, wherein the containment structure defines a radial cross-section and the at least one circumferential groove is an asymmetrical groove defining an asymmetrical shape in the radial cross-section.

7. The air turbine starter of any of the preceding clauses, wherein the containment structure defines a radial cross-section and the at least one circumferential groove is an asymmetrical groove defining an asymmetrical shape in the radial cross-section.

8. The air turbine starter of any of the preceding clauses, wherein the at least one circumferential groove is multiple circumferential grooves each including multiple asymmetrical grooves and at least one symmetrical groove where the symmetrical groove defines a symmetrical shape in the radial cross-section.

9. The air turbine starter of any of the preceding clauses, wherein the at least one symmetrical groove is centrally located in the radial cross-section and together with the multiple asymmetrical grooves forms a symmetrical pattern in the radial cross-section.

10. The air turbine starter of any of the preceding clauses, wherein the outer surface comprises an arch shape.

11. The air turbine starter of any of the preceding clauses, wherein the at least one circumferential groove is multiple circumferential grooves defining fingers between sequential grooves.

12. The air turbine starter of any of the preceding clauses, wherein the fingers are made of a different material than a remaining portion of the containment structure.

13. The air turbine starter of any of the preceding clauses, further comprising at least one layer of shape memory alloy extends circumferentially along at least a portion of the containment structure.

14. The air turbine starter of any of the preceding clauses, wherein the outer surface is spaced from the interior surface of the housing to define a clearance distance and the inner surface faces the plurality of circumferentially spaced blades.

15. A method of forming a containment structure for an air turbine starter, the method comprising forming the containment structure with an outer surface and an inner surface, and forming at least one circumferential groove in the inner surface.

16. The method of any of the preceding clauses, wherein forming the at least one circumferential groove further comprises forming multiple circumferential grooves.

17. The method of any of the preceding clauses, further comprising forming at least one symmetrical groove defining a symmetrical shape in a radial cross-section of the containment structure.

18. The method of any of the preceding clauses, further comprising forming at least one asymmetrical groove defining an asymmetrical shape in the radial cross-section.

19. The method of any of the preceding clauses, further comprising forming the at least one symmetrical groove in a central location of the radial cross-section and forming multiple asymmetrical grooves on either side of the at least one symmetrical groove to form a symmetrical pattern.

20. The method of any of the preceding clauses, further comprising forming at least one layer of a shape memory alloy along at least one of the outer surface or the inner surface.

What is claimed is:

1. An air turbine starter for starting an engine, comprising:
a housing having an interior surface defining an interior;
at least one turbine member rotatably mounted within the interior about a rotational axis, and having a plurality of circumferentially spaced blades; and
a containment structure separate from the housing, the containment structure being disposed in the interior of the housing and radially overlying and circumferentially surrounding the at least one turbine member, the containment structure having:
a body extending between an inner surface and an outer surface, the body having a radial cross-section, the body having a plurality of ribs forming a respective portion of the inner surface; and
at least two circumferential grooves, with each circumferential groove of the at least two circumferential grooves being axially bounded by two axially adjacent ribs of the plurality of ribs;
wherein the plurality of ribs and the at least two circumferential grooves define regions of the containment structure that absorb an impact of a loose component from the at least one turbine member, the plurality of ribs being configured to stretch and deform when impacted by the loose component and retain the loose component within the containment structure after impact.

2. The air turbine starter of claim 1, wherein:
each circumferential groove of the at least two circumferential grooves have a respective axial width defined as a maximum axial distance the circumferential groove extends in the radial cross-section; and
D at least two of the axial widths of the at least two circumferential grooves are non-equal.

3. The air turbine starter of claim 2, wherein each circumferential groove of the at least two circumferential grooves terminates at a radially distal end within the containment structure, and includes a depth defined as a maximum radial distance between the distal end and the inner surface of the containment structure in the radial cross-section.

4. The air turbine starter of claim 3, wherein at least two circumferential grooves of the at least two circumferential grooves include non-equal depths with respect to one another.

5. The air turbine starter of claim 3, wherein the depth is larger than the axial width for each circumferential groove of the at least two circumferential grooves.

6. The air turbine starter of claim 1, further comprising a transverse hoop stiffener extending axially along a respective portion of the inner surface.

7. The air turbine starter of claim 1, wherein an axially forwardmost rib of the plurality of ribs defines a forward face of the body, and an axially rearmost rib of the plurality of ribs defines an aft face of the body.

8. The air turbine starter of claim 1, further comprising at least one spring, wherein, during normal operation of the air turbine starter, the containment structure is configured to float against frictional resistance provided by the at least one spring, and further configured to become dislodged from the at least one spring and to rotate freely within the housing in response to the impact from the loose component of the at least one turbine member on the inner surface of the containment structure.

9. The air turbine starter of claim 1, wherein the at least two circumferential grooves are provided within multiple circumferential grooves that form a symmetrical pattern in the radial cross-section.

10. The air turbine starter of claim 1, wherein the at least two circumferential grooves are provided within multiple circumferential grooves, the multiple circumferential grooves having multiple asymmetrical grooves and at least one symmetrical groove where the symmetrical groove defines a symmetrical shape in the radial cross-section.

11. The air turbine starter of claim 10, wherein the at least one symmetrical groove is axially centrally located within the multiple asymmetrical grooves, with respect to the rotational axis, and together with the multiple asymmetrical grooves forms a symmetrical pattern in the radial cross-section.

12. The air turbine starter of claim 1, wherein each rib of the plurality of ribs includes an axial width in the radial cross-section, and wherein:
the axial width of the plurality of ribs is non-equal between ribs; or
at least one of the axial widths of the plurality of ribs is non-equal to at least one of the axial widths of the at least two circumferential grooves.

13. The air turbine starter of claim 12, wherein the plurality of ribs form circumferential hoop stiffeners.

14. The air turbine starter of claim 1, wherein the containment structure further comprises a plurality of locating tabs extending axially outward from a downstream end of the containment structure, the plurality of locating tabs locating the containment structure within the housing.

15. The air turbine starter of claim 1, wherein the plurality of ribs are made of a different material than a remaining portion of the containment structure.

16. The air turbine starter of claim 1, wherein the at least two circumferential grooves comprises:
a first circumferential groove having a first axial width;
a second circumferential groove, axially downstream of the first circumferential groove, having a second axial width; and
a third circumferential groove, axially downstream of the second circumferential groove, having a third axial width, equal to the first axial width;
wherein the second axial width is larger than the first axial width and the third axial width.

17. The air turbine starter of claim 1, wherein:
a first circumferential groove of the at least two circumferential grooves includes an asymmetric shape in the radial cross-section; and
a second circumferential groove of the at least two circumferential grooves includes a symmetric shape in the radial cross-section.

18. The air turbine starter of claim 1, wherein the containment structure further comprises at least one layer of shape memory alloy provided along one of the outer surface or the inner surface.

19. The air turbine starter of claim 1, wherein the containment structure further comprises at least one layer of shape memory provided radially between the inner surface and the outer surface.

20. The air turbine starter of claim 1, wherein the engine is a turbine engine.

* * * * *